US005679254A

United States Patent [19]

Chakrabarti

[11] Patent Number: 5,679,254
[45] Date of Patent: Oct. 21, 1997

[54] DESALINATION OF SEAWATER BY NONIONIC SURFACTANT AIDED PHASE SEPARATION

[76] Inventor: Debtosh Chakrabarti, 156 Renaissance Dr., Cherry Hill, N.J. 08003

[21] Appl. No.: 560,745

[22] Filed: Nov. 20, 1995

[51] Int. Cl.$^6$ ...................................... B01D 11/04
[52] U.S. Cl. ................... 210/642; 203/DIG. 17; 210/669; 210/702; 210/774
[58] Field of Search .................. 210/702, 634, 210/511, 642, 669, 774, 806; 203/10, DIG. 17

[56] References Cited

U.S. PATENT DOCUMENTS

| Re. 28,002 | 4/1974 | Edison | 210/642 |
| 3,165,384 | 1/1965 | Reid | 210/642 X |
| 3,706,659 | 12/1972 | Davis, Jr. | 201/642 X |
| 4,652,375 | 3/1987 | Heilweil et al. | 210/634 |
| 5,539,087 | 7/1996 | Restelli et al. | 530/412 |

*Primary Examiner*—Joseph W. Drodge
*Attorney, Agent, or Firm*—Frederick L. Herman

[57] ABSTRACT

A novel process for the extraction of salt from seawater based on the unique solubility properties of nonionic surfactants and the relative phobia of inorganic salts to organic surfactants has been developed. Nonionic surfactant is first added to the seawater to form a homogenous mixture. Then the temperature of the mixture is adjusted to cause it to separate into aqueous salt-rich and relatively salt-free phases. The relatively salt-free phase is then caused to phase separate into a surfactant-rich phase and a relatively surfactant-free and relatively salt-free water phase by further temperature adjustment. Finally, these latter two phases are separated to recover salt-free water.

25 Claims, 6 Drawing Sheets

DESALINATION OF SEAWATER BY NONIONIC SURFACTANT AIDED PHASE SEPARATION

BACKGROUND—FIELD OF INVENTION

This process/invention relates to the desalination of seawater.

BACKGROUND—DESCRIPTION OF PRIOR ART

Fresh water is a precious resource in many regions of the world. It is a necessary commodity for a nation's strength and economic growth. Though water constitutes 80% of the earth's surface, its distribution and mineral contents are so skewed that only a tiny portion of it lends itself to human usage. This is because human use of water, whether it is for domestic, agricultural, or industrial purposes, almost always requires flesh water.

Over 97.2% of all water on the earth is salty and most of it is in oceans. Of the approximately 2.8% that constitutes the so-called "fresh water," about 2.14% is locked up in polar ice caps, 0.61% is buffed under ground, and 0.009% is confined to fresh-water lakes of which over 80% is in a single lake, the Lake Baikal, in a remote region of Russia. Thus, only a tiny portion of the total water of this planet—a paltry 0.06% or so, consisting of streams, rivers, ponds, fresh-water lakes, aquifers, etc.,—is fresh and suitable for human consumption Unfortunately, however, fresh water is not distributed evenly along the population centers. In certain regions where surface water is scarce, modem technology of deep-well pumping has made deep-seated ground water too easily accessible to us. In many instances this has led to reckless withdrawal, putting the future of many regions in perilous condition. The situation is particularly serious since in many cases natural replenishment of the depleted ground water could take thousands of years.

The point is that in spite of abundance of water on the earth's surface, there are regions whose future is being threatened by the absence of suitable sources of fresh water.

The real irony of the matter is that the majority of the regions that suffer from fresh water shortage have direct access to unlimited quantities of saline water. Thus, desalination of sea water seems to be the only logical solution to the fresh water crisis. Here the term sea water is used to include a broad range of saline water—water of high salinity (35,000 to 40,000 parts per million (ppm) salt) from oceans and inland seas, as well as water of medium salinity (10,000 to 35,000 ppm salt), the so-called "brackish water," from salt-lakes and other inland saline sources.

Desalination is a term applied to various processes for desalting saline water, so that it can be used for industrial, agricultural or domestic purposes. Four different technologies—distillation, reverse osmosis, electrodialysis, and freezing—are currently available for this purpose. During 1987, there were 3,027 desalination plants worldwide with a combined capacity of over 3 billion gallons per day, the respective shares of the technologies being 71.5% for distillation, 24% for reverse osmosis, 4.5% for electrodialysis, and 0% for freezing.

Though 3 billion gallons per day is a large volume, it is only a tiny fraction of the potential demand for desalination. The major stumbling block to widespread application of desalination is cost. High cost has confined desalination to those nations where there is barely any other alternative, i.e., in nations such as Saudi Arabia.

The key cost components of desalination are: cost of energy and cost of materials and equipment.

Distillation is the oldest and most common desalination technique. Distillation, however, is an energy intensive process since it requires not only heating the water to its boiling point but also supplying to it the high latent heat of evaporation.

Reverse Osmosis is based on the use of semipermeable membranes, namely membranes that are permeable to water but not to dissolved salts. The semipermeable membrane commonly used for this purpose is made of cellulose acetate. Seawater may have to be passed at pressures up to 1500 psi across this membrane to obtain a reasonable flow of fresh water. Since the membrane is fragile, reverse osmosis equipment must provide an elaborate mechanical support to avoid rupturing of the membrane. The delicate nature of the membrane and the intricacy of the equipment design require that the feed water is free of excessive quantities of suspended solids, bacteria, and algae to prevent clogging. Furthermore, scale formation by water hardness that can greatly reduce operating efficiency of the modules, must be controlled either by pH modification or by addition of antiscalants, or both. Though reverse osmosis is less energy intensive that distillation, the high costs of membranes, equipment and pre-treatment all add up to make reverse osmosis almost as expensive.

The third major desalination process, electrodialysis, is also based on the use of semipermeable membranes. But here ions of salt pass through the membranes under the influence of an electric field, rather than molecules of water under pressure. Two kinds of membranes—one permeable to cations and another permeable to anions—are used in conjunction with each other. Commercial electrodialysis equipment contains several hundred membranes packed in intricately designed modules and the pre-treatment requirements mentioned under reverse osmosis also apply here. Electrodialysis is most suitable for desalting water of medium salinity (10,000 to 35,000 ppm), which is the only area where it becomes cost-competitive to reverse osmosis.

The concept of the freezing-desalination process depends upon the phase behavior of brine. As the temperature of brine is reduced to the freezing point of water, pure water solidifies, leaving a more concentrated, lower freezing brine. Recovery of desalted water involves washing the ice crystals free of salt followed by melting. Freezing desalination however, has not moved beyond piloting due to inability to develop sound engineering and economically competitive systems after three decades of research.

The current desalination processes are hindered by their energy intensive procedures such as pumping, pressurizing, forcing liquids through resistive membranes and tortuous paths, phase change, etc.

SUMMARY OF THE INVENTION

This process of the present invention desalinates seawater while avoiding the tortuous and "roller coaster" energy pathways used in prior art techniques. This new technique creates desalinated seawater without the energy intensive techniques of current commercial desalination processes such as pumping, pressurizing, forcing liquids through tortuous paths, phase change, etc. This process constitutes the simplest and least energy intensive desalination process ever conceived.

This new, state-of-the-an, technique is simple—it does not use expensive membranes, nor does it use sophisticated equipment. Energy requirement is also minimal for there is no forcing of liquids through resistive membranes, nor is there need for energy intensive phase changes. All these problems that are circumvented by this new method are clearly present in all prior art methods of desalination.

Another object of the present invention is to provide a process which uses much lower cost equipment and much less energy that prior art methods.

Further objects and advantages will become obvious by comparison of this simple, economical method described herein and conventional uneconomical methods.

The concept here is to use an unique class of organic molecules called nonionic surfactants to extract pure water from seawater at or slightly above their so-called "cloud point", and then to squeeze out most of the water from the extract by heating it only several degrees above the cloud points. It constitutes the simplest and least energy intensive desalination process ever conceived. To fully appreciate the principle behind the concept it will be necessary to understand the structural features of these molecules, the nature of their interaction with water, the mechanism of the influence of temperature on this interaction, and the principles that lie behind the phenomenon called "cloud point."

Nonionic surfactants are molecules that have a nonpolar segment usually consisting of a long hydrocarbon chain and a polar segment usually consisting of a polyethyleneoxy chain. The most common form of nonionic surfactants are prepared by adding reputed units of ethylene oxide to a long chain aliphatic alcohol or alkyl phenol, as shown by the following equations.

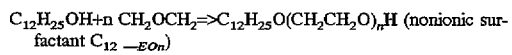
$C_{12}H_{25}OH + n\ CH_2OCH_2 \Rightarrow C_{12}H_{25}O(CH_2CH_2O)_nH$ (nonionic surfactant $C_{12}$—$EO_n$)

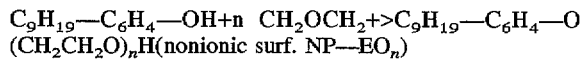
$C_9H_{19}$—$C_6H_4$—$OH + n\ CH_2OCH_2 \Rightarrow C_9H_{19}$—$C_6H_4$—$O(CH_2CH_2O)_nH$ (nonionic surf. NP—$EO_n$)

For the purpose of brevity, the nonionic structure shown in the first equation is designated $C_{12}$—$EO_n$, meaning that it has two segments—one derived from $C_{12}$ alcohol and the other from a polyethyleneoxy chain with n ethyleneoxy units. Similarly the second structure is called NP—$EO_n$, where NP stands for nonyl phenol. Nonionic surfactants by these and other similar structures are common industrial chemicals and are used for cleaning, textile processing, emulsification, and a variety of other purposes. By no means is this cloud point phenomenon or the forthcoming phenomena discovered limited to these two types of nonionic surfactants. These phenomena which this new process of desalination capitalizes on are inherent in all nonionic surfactants, however, certain types are more suited for desalination that others.

What makes these structures surfactants? Surfactants are long molecules with dual affinities. One segment of the molecule is water-hating (hydrophobic) and the other water loving (hydrophilic). In the above structures, the long chain alcohol or the nonyl phenol moiety acts as the hydrophobic segment and the polyethyleneoxy chain acts as the hydrophilic segment. The mechanism by which the polyethyleneoxy segment shows hydrophilicity is critical of the understanding of why nonionic surfactants exhibit cloud point phenomenon and how they can be useful in desalination as shown forthwith.

The polyethyleneoxy chain owes its hydrophilicity to extensive hydrogen bonding with water molecules via the ether linkages. Thus, the greater the number of repeating units of ethyleneoxy groups in the chain, the greater is its hydrophilicity. For the surfactant molecule as a whole its solubility in water thus increases with its polyethyleneoxy content and when the latter is about 60–70% by weight of the total molecule, complete solubility occurs at room temperature.

Solubility of a nonionic surfactant and for that matter of any surfactant does not mean intrinsic solubility of the individual molecules, rather it means solubility of their aggregates, called micelles. In fact solubilities of the individual molecules of some of the most soluble nonionic surfactants are quite negligible, $10^{-4}$ to $10^{-5}$ mol/L. When the concentration of surfactant molecules in solution exceeds their molecular solubility, the molecules form oriented micelles in which the hydrophilic segments are exposed to water and the hydrophobic segments are hidden away from water toward the center of the micelles. A surfactant solution thus, truly is a dispersion of micelles in water. Since micelles are smaller than the wavelength of light, their dispersion appears transparent and behaves like a true solution. The concentration of a surfactant at which micelle formation begins, i.e. the intrinsic solubility of the individual molecules of the surfactant, is called its critical micellar concentration or briefly, CMC.

Since solubility of nonionic surfactants in water depends upon hydrogen bonding, factors that inhibit hydrogen bonding also reduce this solubility. Heat is one such factor. The energy of the hydrogen bond (about 7 kcal/mole) is insufficient to retain water molecules on polyethyleneoxy chains when nonionic surfactants are heated in solution; dehydration takes place at elevated temperature and most of the surfactants separate out from the solution. The temperature at which solution of a nonionic surfactant exhibits turbidity is called its cloud point. The cloud point of a nonionic surfactant derived from any particular hydrophobe increases with increasing length of the polyethyleneoxy chain and for a given length of the polyethyleneoxy chain, it decreases with increasing size of the hydrophobe. It is to be understood that a nonionic surfactant can still remain in the aqueous phase in significant quantities at its cloud point since the latter represents a transition point. However, as the temperature is increased slightly, e.g. by barely 3 degrees Centigrade in the case of NP—$EO_{9.6}$ (cloud point 63 Deg C.), the solubility essentially vanishes to the CMC level.

Though nonionic surfactant may be essentially insoluble in water above their cloud point temperatures, the reverse is not true. Thus when the same nonionic surfactant, NP—$EO^{9.6}$, is treated with water at 90 deg C. it dissolves about 30% of its own weight of water; then as the temperature is decreased, the water content progressively increases and at a temperature slightly above the cloud point reaches about 900% of the weight of the surfactant. If the temperature drops below the cloud point, then by definition, phase boundaries disappear and the nonionic surfactant becomes completely miscible with water.

Keeping the preceding theories in mind, this new desalination process capitalizes on the phenomena of the cloud point temperature dropping when pure water is substituted with salt water. A two phase system consisting of salt water and a nonionic surfactant above the cloud point is allowed to equilibrate. First, since the salt adversely affects hydrogen bonding, the cloud point temperature is lowered below that observed in pure water. Relatively salt-free water will migrate to the surfactant because the surfactant, which is organic in nature, has a natural aversion of inorganic salts; the salt concentration in the aqueous phase will go up in consequence. The water content in the surfactant is also higher at the cloud point since the new cloud point temperature is lower. The concentration of surfactant in salt water at a particular temperature above the cloud point is even lower than that observed in pure water at the same temperature, since the CMC in the salt water is lower.

DETAILED DESCRIPTION OF THE INVENTION

Figure 1:
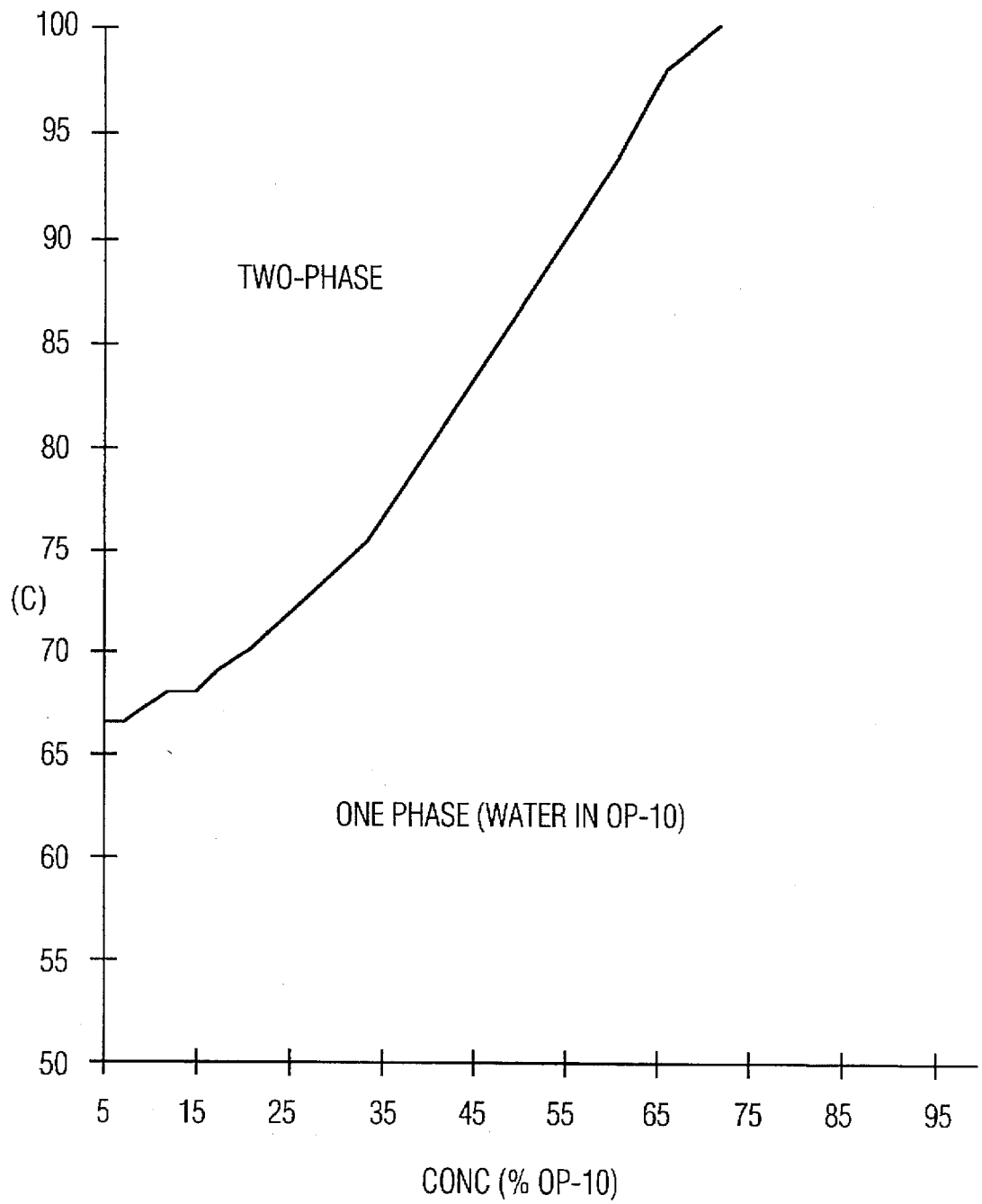
FIG. 1 is a phase diagram of the surfactant OP-10 and Water.

This new, economical process for desalination of seawater operates as follows. Seawater containing 30,000 ppm or higher salt, is mixed at ambient temperature with a nonionic surfactant. The nonionic surfactant is chosen such that its cloud point is higher than the ambient temperature. The result is a homogeneous solution of the surfactant in seawater. The solution is then heated just a few degrees above the cloud point (of that surfactant in saltwater), where upon it separates into two liquid phases—an aqueous phase with almost all the salt but practically no surfactant, and a water-rich-surfactant phase with almost nil the surfactant but practically no salt. The two phases are separated from each other by either decantation or cyclone separation. The aqueous phase, a highly concentrated brine solution, is returned to the sea, the water-rich-surfactant phase is heated to a higher temperature (about a few degrees higher than the pure water cloud point), whereupon it releases most of its water as a separate phase. The water that separates is free of salt and contains only traces of surfactant. The surfactant phase that now contains only a minute amount of water is separated (again by either decantation or cyclone separation) and recycled. For industrial and agricultural use, the desalinated water thus obtained should be directly usable without further purification. For domestic use, the water can be disinfected and the trace surfactants removed by adsorption on a carbon-bed. The process is simple—it does not use expensive membranes nor does it require sophisticated equipment. Energy requirement is also minimal for there is no forcing of liquids through resistive membranes nor is there need for energy intensive phase changes.

Experimental and Results

Materials

The nonionic surfactants used in this study were obtained from PPG Industries and BASF Corporation. These brand names are not necessary and any manufacturer may be used for the specific compounds. Each sample was heated at 130 degrees Centigrade under vacuum for 3 hours to remove any excess moisture.

The other chemicals were purchased through catalogue companies.

Determination of Cloud Points of Nonionic Surfactants

The cloud point of a nonionic surfactant solution is the temperature at which the surfactant becomes insoluble and separates out from the solution. The transition point is indicated by the first appearance of cloudiness (phase separation upon heating).

The general method of determining cloud points consisted of mixing one part (unless otherwise specified) of the surfactant under investigation with 99 parts of water (or brine) and cooling it if necessary (when the cloud point of the mixture is below room temperature) until a clear solution. The solution was then gradually heated with stirring and thermometric monitoring until it turned cloudy. The temperature at this point was noted. The reported cloud point was the average of the clouding and clearing temperatures.

TABLE 1

Cloud Points of Various Nonionic Surfactants (1% surfactant in distilled water)

| Surfactant | Cloud Pt. (°C.) |
| --- | --- |
| Dodecylphenol + 6.0 EO | <0 |
| Dodecylphenol + 10.0 EO | 40 |
| Dodecylphenol + 12.0 EO | 66 |
| Nonylphenol + 1.5 EO | <0 |
| Nonylphenol + 4.0 EO | <0 |
| Nonylphenol + 5.0 EO | <0 |
| Nonylphenol + 6.0 EO | <0 |
| Nonylphenol + 7.5 EO | 25 |
| Nonylphenol + 9.0 EO | 54 |
| Nonylphenol + 10.0 EO | 65 |
| Nonylphenol + 10.5 EO | 74 |
| Nonylphenol + 12.0 EO | 83 |
| Nonylphenol + 15.0 EO | 95 |
| Nonylphenol + 20.0 EO | 98 |
| Octyphenol + 5.0 EO | <0 |
| Octyphenol + 9.0 EO | 63 |
| Octyphenol + 10.0 EO | 67 |
| Octyphenol + 12.0 EO | 85 |
| Octyphenol + 20.0 EO | 95 |
| Octyphenol + 30.0 EO | >100 |
| Tridecylalcohol + 3.0 EO | <0 |
| Tridecylalcohol + 6.0 EO | <0 |
| Tridecylalcohol + 9.7 EO | 62 |
| Tridecylalcohol + 12.0 EO | 90 |
| Tridecylalcohol + 15.0 EO | >100 |
| $C_{12}$–$C_{15}$ Primary Alcohol + 3.0 EO | <0 |
| $C_{12}$–$C_{15}$ Primary Alcohol + 7.0 EO | 50 |
| $C_{12}$–$C_{15}$ Primary Alcohol + 9.0 EO | 75 |
| $C_{12}$–$C_{15}$ Primary Alcohol + 12.0 EO | 100 |
| Pluronic L-61[1] | 24 |
| Pluronic 17R2[1] | 31 |
| Pluronic F-127[1] | 99 |

[1]These are copolymers of ethylene oxide and propylene oxide manufactured an sold by BASF Corporation.

TABLE 2

Cloud Points of Various Mixtures of OP-10 and OP-5 (1% surfactant in distilled water)

| Surfactant Ratio (OP-10/OP-5) w/w | Cloud Pt. (°C.) |
| --- | --- |
| 0/10 | <0 |
| 5/5 | 10 |
| 6/4 | 26 |
| 7/3 | 37 |
| 10/0 | 67 |

From this point herein for brevity the nonionic surfactants octylphenol+10 ethylene oxide units and octylphenol+5 ethylene oxide units will be referred to as OP-10 and OP-5 respectively. The brand used for these experiments were Macol OP-10 and Macol OP-5, both trademarks of PPG Industries Inc. of Pittsburgh, Pa., however any brand of these compounds will suffice The surfactants OP-5 and OP-10 were used in the study as the nonionic surfactants for desalination. While many nonionic surfactants are suitable for desalination of seawater it is not feasible to conduct all the tests of every possible nonionic surfactant. Thus these two surfactants were chosen to model nonionic surfactants in this study. These surfactants were next tested alone and in combination for their cloud points in different concentrations in pure water and 3.5% NaCl brine.

TABLE 3

Cloud Points of OP-10 and OP-5 in Pure Water and 3.5% NaCl

| Surfactant | Conc. of surfactant (%) | Cloud Pt (°C.) Dist Water | Cloud Pt (°C.) 3.5% NaCl | Temperature Difference (°C.) |
|---|---|---|---|---|
| OP-5 | 5 | <0 | <0 | — |
| OP-10 | 5 | 67 | 57 | 10 |
| OP-10 | 1 | 67 | 57 | 10 |
| OP-10 | 0.1 | 67 | 57 | 10 |
| OP-10/OP-5 (60/40) | 5 | 26 | 16 | 10 |
| OP-10/OP-5 (60/40) | 2.5 | 26 | 16 | 10 |
| OP-10/OP-5 (60/40) | 1.25 | 26 | 16 | 10 |
| OP-10/OP-5 (60/40) | 0.62 | 26 | 16 | 10 |
| OP-10/OP-5 (60/40) | 0.31 | 25 | 15 | 10 |
| OP-10/OP-5 (60/40) | 0.16 | 24 | 15 | 9 |
| OP-10/OP-5 (60/40) | 0.08 | 24 | 15 | 9 |
| OP-10/OP-5 (70/30) | 5 | 37 | 28 | 9 |
| OP-10/OP-5 (70/30) | 2.5 | 37 | 28 | 9 |
| OP-10/OP-5 (70/30) | 1.25 | 37 | 28 | 9 |
| OP-10/OP-5 (70/30) | 0.62 | 37 | 28 | 9 |
| OP-10/OP-5 (70/30) | 0.31 | 36 | 27 | 9 |
| OP-10/OP-5 (70/30) | 0.16 | 36 | 27 | 9 |
| OP-10/OP-5 (70/30) | 0.08 | 36 | 27 | 9 |

General Procedure for Determinations of Solubility Compositions (Solubility Curve) of Water/Nonionic Surfactant and Brine (NaCl)/Nonionic Surfactant Systems as a Function of Temperature: Construction of Phase Diagrams.

Solubility of water or brine in a nonionic surfactant at any specific temperature can be determined by carefully separating the surfactant phase from a composition that provides excess of one of the components so as to provide a two phase system at the desired temperature. The surfactant phase can than be analyzed for water and salt content and its composition calculated. This process was found to be very difficult to reproduce, since it was difficult to maintain the entire system at constant temperature while removing the surfactant phase. The following simple procedure proved to be highly reproducible and provided a highly accurate measure of solubility of water or brine in a nonionic surfactant as a function of temperature.

To a certain weight of the surfactant a small mount of water or brine was added. The mixture was heated or cooled until clear. The temperature at which the two phase system became a clear single-phase and vice-versa was noted. The solubility composition was the composition of the mixture at this phase transition temperature. Once the solubility temperature of this pre-assigned composition was determined, the latter was changed by adding a small aliquot of water or brine and the solubility temperature of the new pre-assigned composition was determined as before. The process was repeated until the composition contained 5% or less of surfactant and 95% or more of water or brine in certain experiments a single composition gave more than one solubility temperature. A careful determination of these solubility temperatures offered a convenient and accurate method for constructing phase diagrams of surfactant: water and surfactant: brine systems.

Solubility Compositions vs. Temperatures: Water m OP-10

Following the procedure described in the latter section (General Method . . . Phase Diagrams), solubility temperatures of different combinations of OP-10 and water were determined. These compositions (in %) were calculated from the weight of octylphenol and water used. In each case, above the cloud point temperature and up to 100° C., two distinct phases coexisted; below the solubility temperature and down to 5° C., each system remained a clear single phase. Phase diagrams (graphical representations) of the OP-10 and water system are shown in FIG. 1.

TABLE 4

Solubility Composition vs. Temperature: Water in OP-10

| OP-10 (g) | Water (g) | Solubility Temp. Cloud Pt (°C.) | Composition at Cloud Point (% OP-10) | (% water) |
|---|---|---|---|---|
| 4.0 | 1.5 | >100 | 72.7 | 27.3 |
| 4.0 | 2.0 | 98 | 66.7 | 33.3 |
| 4.0 | 2.5 | 94 | 61.5 | 39.5 |
| 4.0 | 4.0 | 86.5 | 50 | 50 |
| 4.0 | 6.0 | 80 | 40 | 60 |
| 1.0 | 2.0 | 75.5 | 33.3 | 66.7 |
| 1.0 | 3.0 | 72 | 23 | 75 |
| 1.0 | 4.0 | 70 | 20 | 80 |
| 1.0 | 5.0 | 69 | 16.7 | 83.3 |
| 1.0 | 6.0 | 68 | 14.3 | 85.7 |
| 1.0 | 8.0 | 68 | 11.1 | 89.9 |
| 0.2 | 2.8 | 66.5 | 6.7 | 93.3 |
| 0.2 | 3.8 | 66.5 | 5.0 | 95 |

Solubility Composition vs. Temperature: 3.5% Brine (NaCl) in OP-10

Figure 2:
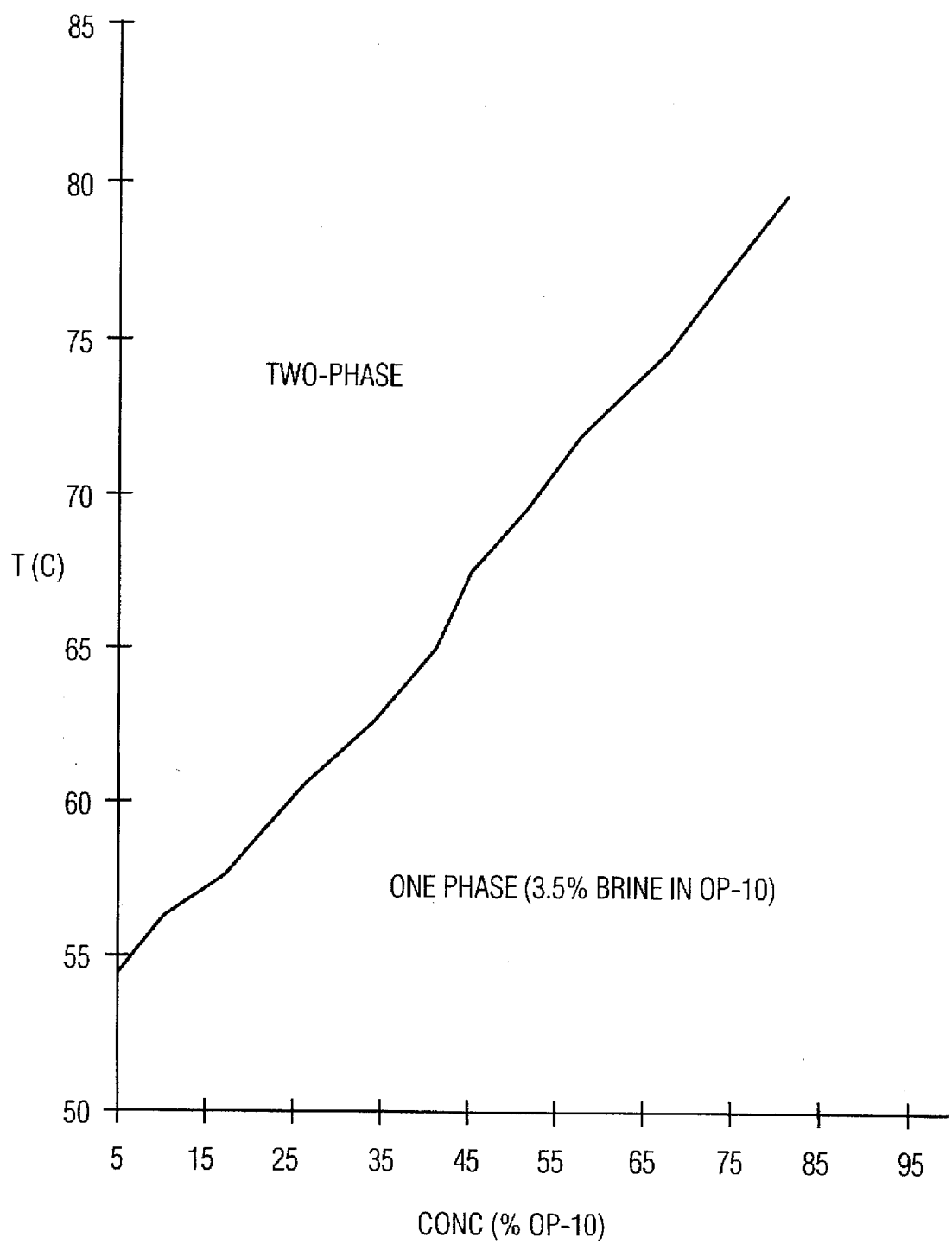
FIG. 2 is a phase diagram of OP-10 and 3.5% Brine.

Procedure similar to the preceding experiment. Again as in the preceding case, each system exhibited two phases above its cloud point and a clear single phase below its cloud point. Phase diagram for the OP-10—brine system is shown in FIG. 2.

TABLE 5

Solubility Composition vs. Temp.: 3.5% Brine in OP-10

| OP-10 (g) | 3.5% NaCl (g) | Solubility Temp. Cloud Point (°C.) | Composition at Cloud Point (% OP-10) | (% Brine) |
|---|---|---|---|---|
| 4.0 | 1.0 | 82.5 | 80 | 20 |
| 4.0 | 2.0 | 77 | 66.7 | 33.3 |
| 4.0 | 3.0 | 74 | 57.1 | 42.9 |
| 4.0 | 4.0 | 71 | 50 | 50 |
| 4.0 | 5.0 | 69 | 44.4 | 55.6 |
| 4.0 | 6.0 | 67.5 | 40 | 60 |
| 1.0 | 2.0 | 63.5 | 33.3 | 66.7 |
| 1.0 | 3.0 | 61 | 25 | 75 |
| 1.0 | 5.0 | 58 | 16.7 | 83.3 |
| 1.0 | 7.0 | 57 | 12.5 | 87.5 |
| 1.0 | 9.0 | 56.5 | 10 | 90 |
| 0.2 | 3.8 | 54.5 | 5 | 95 |

Solubility Compositions vs. Temperatures: Water in OP-5

Figure 3:
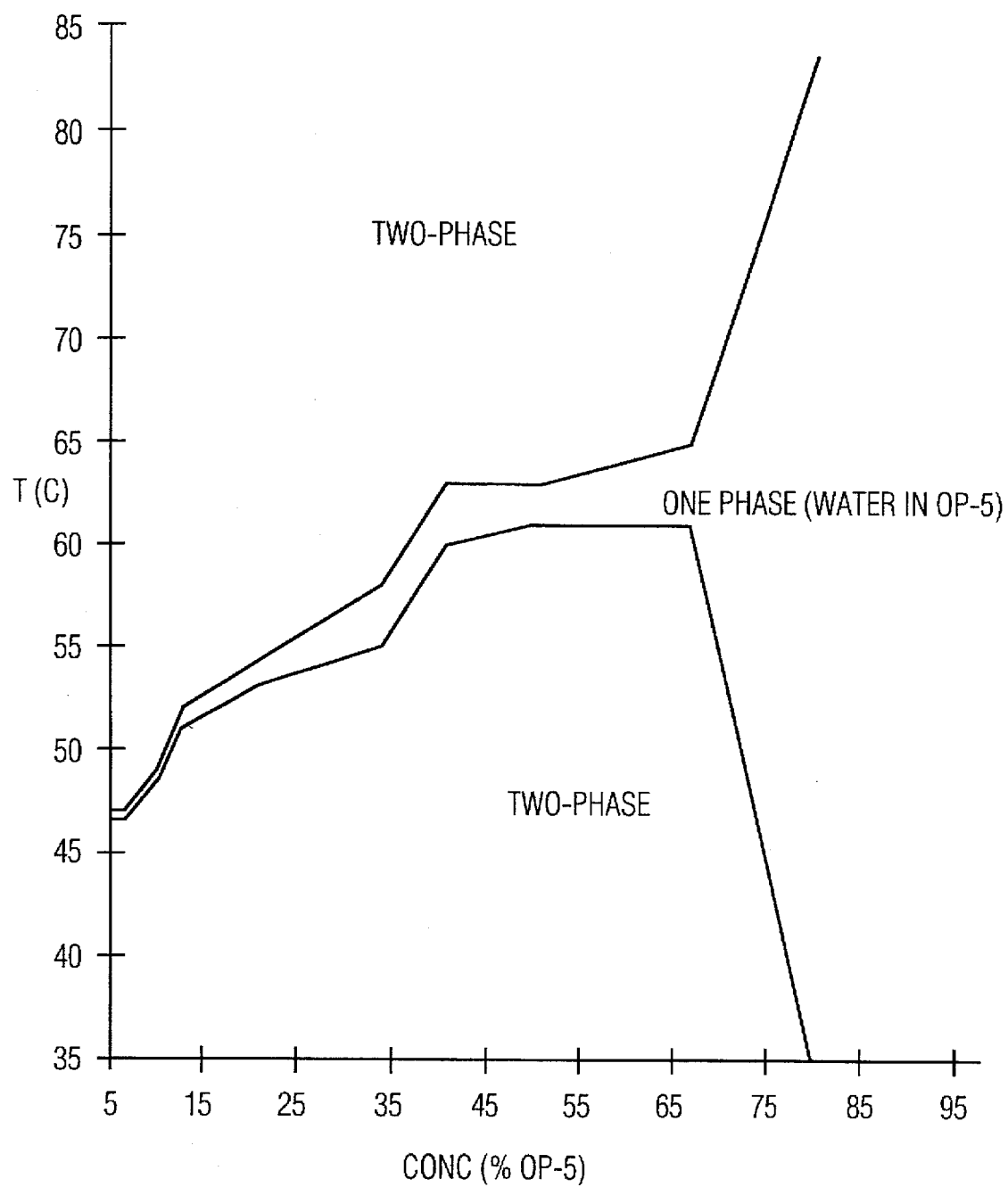
FIG. 3 is a phase diagram of OP-5 and Water.

The general procedure was followed in determining the cloud point temperatures is shown in the following table. Unlike the OP-10/water system the OP-5/water system showed a complex behavior. In several cases more that one cloud point was observed. In compositions where three cloud points were observed, there were two distinct phases above the highest temperature. Below the highest cloud point, the system remained a clear single phase up to a certain point. The temperature range within which the system remained clear depended upon the composition and ranged from one to several degrees. Below the clear temperature range, the system turned cloudy again and remained cloudy until a certain point whence it became clear again. The clarity (single phase) extended down to 5° C., the lowest temperature studied. A phase diagram for the OP-5—water system is shown in FIG. 3.

TABLE 6

Solubility Compositions vs Temperature: Water in OP-5

| OP-5 (g) | Water (g) | Comp (%) OP-5/Water | Cloud Point (°C.) | Phase Behavior at Temp. |
|---|---|---|---|---|
| 4.0 | 1.0 | 80/20 | 83.5 | 83.5–100° C. Two Phases |
|  |  |  | 35 | 35–83.5° C. Single Phase |
|  |  |  |  | 5–35° C. Cloudy Viscous[1] |
| 4.0 | 2.0 | 66.7/33.3 | 65 | 65–100° C. Two Phases |
|  |  |  | 61 | 61–65° C. Single Phase[2] |
|  |  |  |  | 5–61° C. Cloudy Viscous[3] |
| 4.0 | 4.0 | 50/50 | 63 | 63–100° C. Two Phases |
|  |  |  | 61 | 61–63° C. Single Phase |
|  |  |  |  | 5–61° C. Cloudy Viscous[4] |
| 4.0 | 6.0 | 40/60 | 63 | 63–100° C. Two Phases[5] |
|  |  |  | 62 | 62–63° C. Single Phase |
|  |  |  |  | 5–62° C. Cloudy Viscous[6] |
| 1.0 | 4.0 | 20/80 | 54 | 54–100° C. Two Phases |
|  |  |  | 53 | 53–54° C. Single Phase |
|  |  |  |  | 5–54° C. Two Phases[7] |
| 1.0 | 7.0 | 12.5/87.5 | 52 | 52–100° C. Two Phases |
|  |  |  | 51 | 51–52° C. Single Phase |
|  |  |  |  | 5–51° C. Two Phases[8] |
| 1.0 | 9.0 | 10/90 | 49 | 49–100° C. Two Phases |
|  |  |  | 48.5 | 48.5–49° C. Single Phase |
|  |  |  |  | 5–48.5° C. Two Phases[9] |
| 0.5 | 7.0 | 6.7/93.3 | 47 | 47–100° C. Two Phases |
|  |  |  | 46.5 | 46.5–47° C. Single Phase |
|  |  |  |  | 5–46.5° C. Two Phases[10] |
| 0.5 | 9.5 | 5/95 | 47 | 47–100° C. Two Phases |
|  |  |  | 46.5 | 46.5–47° C. Single Phase |
|  |  |  |  | 5–46.5° C. Two Phases[10] |
| 0.05 | 4.55 | 1/99 |  | No clear point between 5 and 100° C. |

[1]Sets into a cloudy gel below 25° C.
[2]@61° C. Thin clear liquid; below 61° C. viscous cloudy
[3]50–61° C. cloudy viscous; below 50° C. sets into a cloudy gel
[4]sets into cloudy gel below 37° C.
[5]fast(<5 min) separation into two phases @67° C.
[6]Sets into gel under 20° C.
[7]Low to medium viscosity, milky
[8]Milky, thin liquid
[9]Thin clear Liquid, Slight Haze, 49° C., fast (<5 min) phase separation @ 55° C.; thin cloudy liquid between 45 and 49° C.; under 45° C. gradually turns viscous, then to a cloudy gel between 20–37° C.; gel thins @ 20° C. and remains a cloudy viscous fluid to 5° C.
[10]A very narrow +/–0.5° C. range of solubility around 47° C. @ 0.5° C. above or below 47° C. the system becomes cloudy. Fast (<5 min.) phase separation into two transparent phases @ 60° C.

Solubility Compositions vs. Temp.: 3.5% Brine (NaCl) in OP-5

Figure 4:
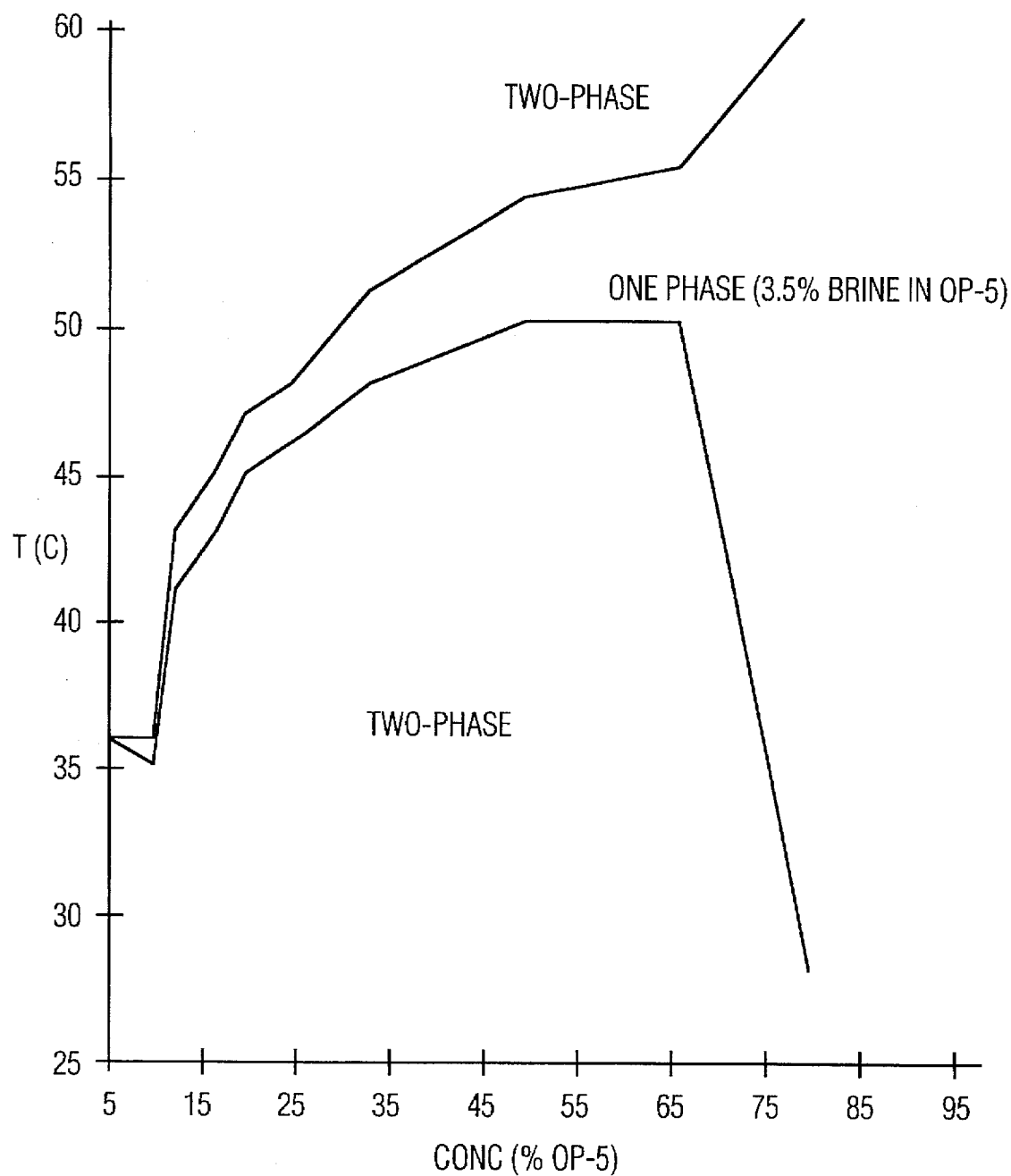
FIG. 4 is a phase diagram of OP-5 and 3.5% Brine.

The procedure followed was the same as in the preceding experiment and the comments made about the observed phase behaviors also apply to this experiment. A phase diagrams for the OP-5—brine system is shown in FIG. 4.

TABLE 7

Solubility Compositions vs. Temperature: 3.5% NaCl in OP-5

| OP-5 (g) | Water (g) | Comp (%) OP-5/Water | Cloud Point (°C.) | Phase Behavior at Temp. |
|---|---|---|---|---|
| 2.0 | 0.5 | 80/20 | 60 | 60–100° C. Two Phases |
|  |  |  | 28 | 28–60° C. Single Phase |
|  |  |  |  | 5–28° C. Cloudy Viscous[1] |
| 2.0 | 1.0 | 66.7/33.3 | 55 | 55–100° C. Two Phases |
|  |  |  | 50 | 50–55° C. Single Phase |
|  |  |  |  | 5–50° C. Cloudy Viscous[2] |
| 2.0 | 2.0 | 50/50 | 54 | 54–100° C. Two Phases |
|  |  |  | 50 | 50–54° C. Single Phase |

TABLE 7-continued

Solubility Compositions vs. Temperature: 3.5% NaCl in OP-5

| OP-5 (g) | Water (g) | Comp (%) OP-5/Water | Cloud Point (°C.) | Phase Behavior at Temp. |
|---|---|---|---|---|
|  |  |  |  | 5–50° C. Cloudy Viscous[3] |
| 2.0 | 4.0 | 33.3/66.7 | 51 | 51–100° C. Two Phases |
|  |  |  | 48 | 48–51° C. Single Phase |
|  |  |  |  | 5–48° C. Cloudy Viscous[4] |
| 2.0 | 6.0 | 25/75 | 48 | 48–100° C. Two Phases |
|  |  |  | 46 | 46–48° C. Single Phase |
|  |  |  |  | 5–46° C. Two Phases |
| 2.0 | 8.0 | 20/80 | 47 | 47–100° C. Two Phases |
|  |  |  | 45 | 45–47° C. Single Phase |
|  |  |  |  | 5–45° C. Two Phases |
| 0.5 | 2.5 | 16.7/83.3 | 45 | 45–100° C. Two Phases |
|  |  |  | 43 | 43–45° C. Single Phase |
|  |  |  |  | 5–43° C. Two Phases |
| 0.5 | 3.5 | 12.5/87.5 | 43 | 43–100° C. Two Phases |
|  |  |  | 41 | 41–43° C. Single Phase |
|  |  |  |  | 5–41° C. Two Phases |
| 0.5 | 4.5 | 10/90 | 36 | 36–100° C. Two Phases |
|  |  |  | 35 | 35–36° C. Single Phase |
|  |  |  |  | 5–35° C. Two Phases |
| 0.05 | 9.5 | 1/99 | 36 | 36–100° C. Two Phases[6] |
|  |  |  | 36 | 5–36° C. Cloudy |

[1]Cloudy viscous @ 28° C. Cloudy gel at 20° C. and below
[2]Viscous, sets into a cloudy gel under 45° C.
[3]Cloudy to hazy on cooling from 51 to 5° C. Under 40° C. sets into gel.
[4]@ about 5–7° C. above the lower temperature of this range fast (<5 min.) phase separation
[5]Viscous @ 46° C. On cooling, viscosity drops to low to medium at 30° C. Does not gel.
[6]@ 36° C. clearest. Still slightly hazy, light cloudiness on both sides of 36° C.

Solubility Compositions vs. Temperatures: Water and 60/40 mixtures of OP-10/OP-5

Figure 5:
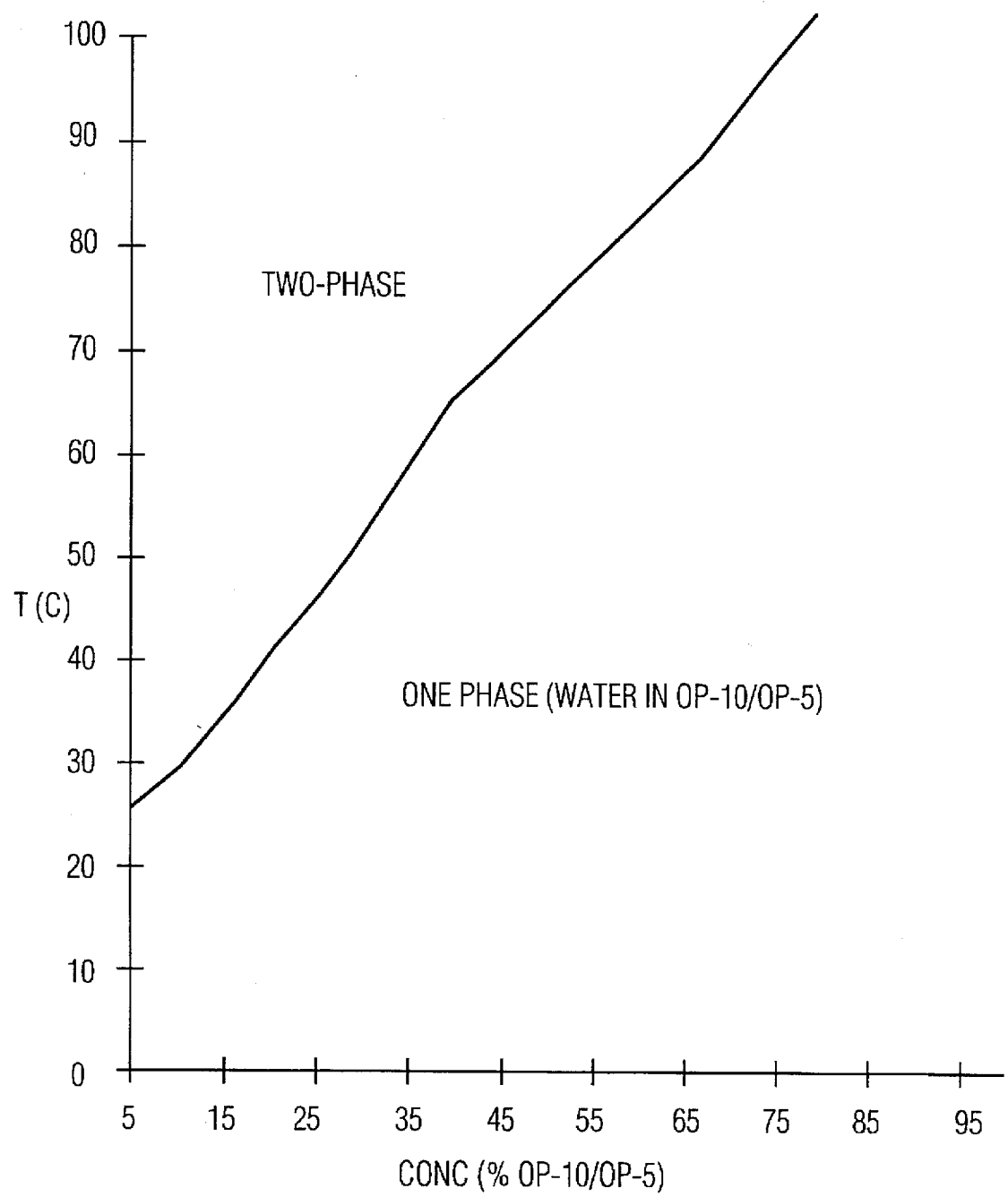
FIG. 5 is a phase diagram of OP-10/OP-5(60/40) w/w% and Water.

Procedure and observations similar to that described in previous experiment. A phase diagram for the OP-10/OP-5—water system is shown in FIG. 5.

TABLE 8

Solubility Compositions vs. Temp: Water in OP-10/OP-5

| OP-10/OP-5 (60/40) (g) | Water (g) | Solub. Temp (cloud point) (°C.) | Composition at Cloud Point % OP10/OP5 | % Water |
|---|---|---|---|---|
| 2.0 | 0.5 | 100[1] | 80.0 | 20.0 |
| 2.0 | 1.0 | 86 | 66.7 | 33.3 |
| 2.0 | 2.0 | 72 | 50.0 | 50.0 |
| 2.0 | 3.0 | 64[2] | 40.0 | 60.6 |
| 2.0 | 4.0 | 55[2] | 33.3 | 66.7 |
| 2.0 | 5.0 | 49[2] | 28.6 | 71.4 |
| 2.0 | 6.0 | 45[2] | 25.0 | 75.0 |
| 2.0 | 8.0 | 40[2] | 20.0 | 80.0 |
| 0.5 | 2.5 | 36 | 16.7 | 83.3 |
| 0.5 | 4.5 | 29 | 10.0 | 90.0 |
| 0.5 | 9.5 | 25 | 5.0 | 95.0 |

[1]A clear gel at room temperature, a clear thin liquid > 35° C.
[2]Low to medium viscosity at clear/cloud point Solubility Compositions vs. Temperature: 3.5% Brine (NaCl) and 60/40 mixture of OP-10/OP-5

Figure 6:
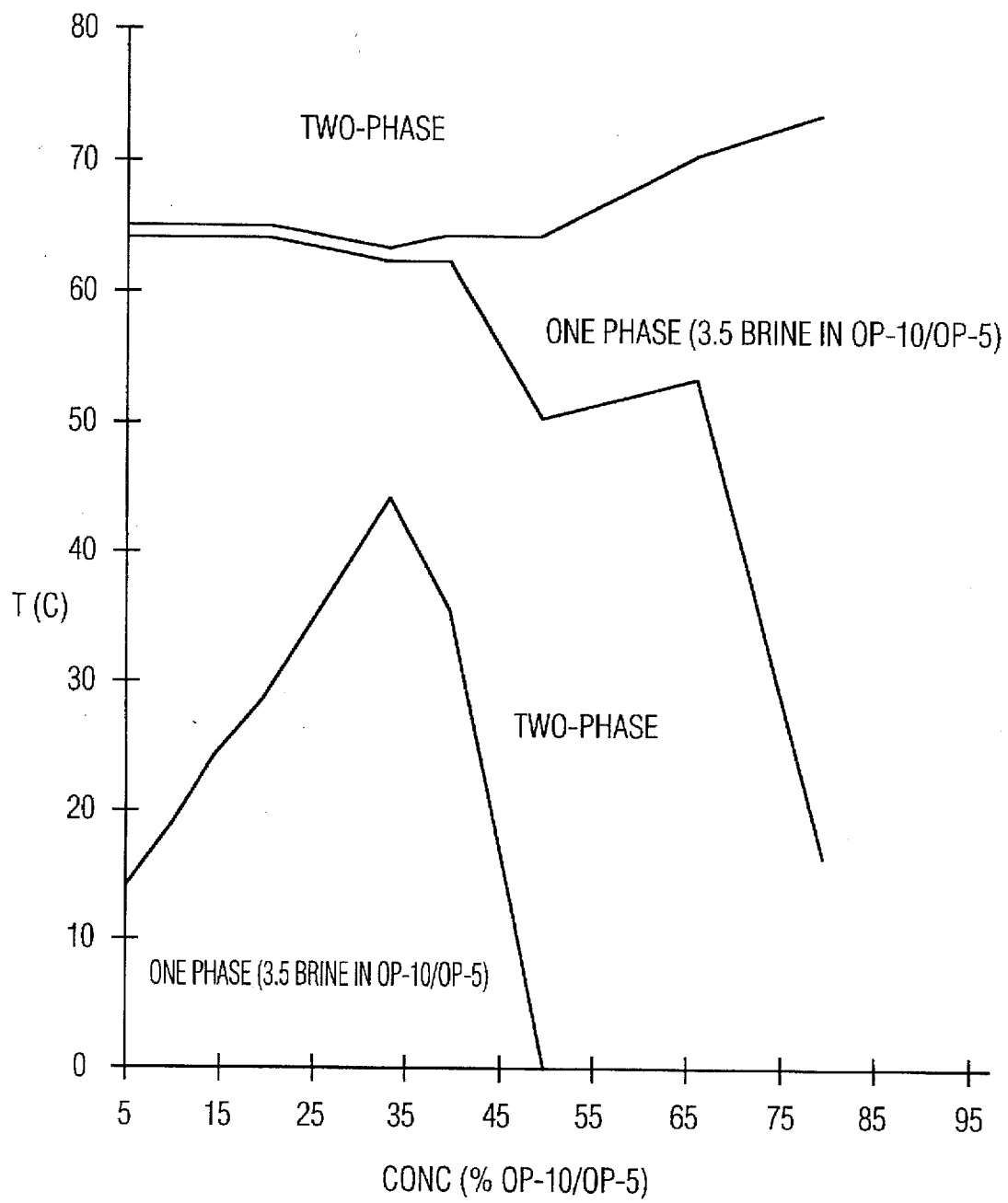
FIG. 6 is a phase diagram of OP-10/OP-5 (60/40) w/w% and 3.5% Brine.

A phase diagrams for the OP-10/OP-5 (60/40)—brine system is shown in FIG. 6.

TABLE 9

Solubility Compositions vs. Temperature: 3.5% NaCl in OP-10/OP-5

| OP-10/ OP-5 (60/40) (g) | Water (g) | Comp (%) OP's/ Brine | Cloud Point (°C.) | Phase Behavior at Temp. |
|---|---|---|---|---|
| 4.0 | 1.0 | 80.0/20.0 | 73 | 73–100° C. Two Phases |
|  |  |  | 16 | 16–73° C. Single Phase[1] |
|  |  |  |  | 5–16° C. Cloudy Viscous[2] |
| 4.0 | 2.0 | 66.7/33.3 | 70 | 70–100° C. Two Phases |
|  |  |  | 53 | 53–70° C. Single Phase |
|  |  |  |  | 5–53° C. Cloudy Viscous |
| 4.0 | 4.0 | 50.0/50.0 | 63 | 63–100° C. Two Phases[3] |
|  |  |  | 50 | 50–63° C. Single Phase[4] |
|  |  |  |  | 5–50° C. Cloudy Viscous[5] |
| 4.0 | 6.0 | 40.0/60.0 | 64 | 64–100° C. Two Phases[6] |
|  |  |  | 62 | 62–64° C. Single Phase |
|  |  |  | 35 | 35–62° C. Two Phases[7] |
|  |  |  |  | 5–35° C. Single Phase[8] |
| 1.0 | 2.0 | 33.3/66.7 | 63 | 63–100° C. Two Phases |
|  |  |  | 62 | 61–63° C. Single Phase |
|  |  |  | 44 | 44–62° C. Two Phases |
|  |  |  |  | 5–44° C. Single Phases[9] |
| 1.0 | 4.0 | 20.0/80.0 | 65 | 66–100° C. Two Phases[10] |
|  |  |  | 64 | 64–65° C. Single Phase[10] |
|  |  |  | 29 | 29–64° C. Two Phases |
|  |  |  |  | 5–29° C. Single Phases |
| 1.0 | 6.0 | 14.3/86.7 | 65 | 66–100° C. Two Phases[10] |
|  |  |  | 64 | 64–65° C. Single Phase[10] |
|  |  |  | 24 | 24–64° C. Two Phases |
|  |  |  |  | 5–24° C. Single Phases |
| 1.0 | 9.0 | 10.0/90.0 | 65 | 66–100° C. Two Phases[10] |
|  |  |  | 64 | 64–65° C. Single Phase[10] |
|  |  |  | 19 | 19–64° C. Two Phases |
|  |  |  |  | 5–19° C. Single Phases |
| 0.5 | 9.5 | 5.0/95.0 | 65 | 66–100° C. Two Phases |
|  |  |  | 64 | 64–65° C. Single Phase |
|  |  |  | 14 | 14–64° C. Two Phases |
|  |  |  |  | 5–14° C. Single Phases |

[1] A thin liquid below 73° C. turns to viscous when cooled to 35° C.
[2] Viscous and cloudy below 16° C.
[3] Viscous at 68° C. Thin and fast (<5 min.) phase separation under 30° C.
[4] Viscous
[5] Slight lowering of cloudiness turning to haziness under 30° C.
[6] Viscous at 64° C., thin and fast (<5 min.) separation at 70° C.
[7] Viscosity decreases under 50° C.
[8] Low viscosity at 35° C. but viscosity gradually increases upon cooling
[9] Low viscosity
[10] Not perfectly clear, slightly hazy Determination of Exact Concentration of NaCl in Brine used in the Experiments To a pre weighed aluminum pan (1.0042 g) a certain mount of the brine was placed and the total accurately weighed (4.6420 g). The pan was then placed in an oven at 130° C. and its contents dried until constant weight (1.1137 g). The percent sodium chloride in the brine was calculated as follows:

% NaCl in Brine=[(1.1137−1.0042)/(4.6420−1.0042)]×100=3.01%

General Procedure for Determining Desalination Efficiency of Surfactant Based Separation Process A quick and efficient method of measuring the degree of desalination that can be achieved by phase extraction of brine with nonionic surfactant was established as follows.

A mixture of known weights of the surfactant and brine was cooled to a temperature where a clear solution resulted (see phase diagrams). A known weight of this solution was then put in a test tube and the test tube heated to a desired constant temperature (above the cloud point as determined from phase diagram) and held in a constant temperature apparatus until two clear phases were obtained. In this experiment a Thermolyne Single Block Dri-Bath incubator (model 17600) was used. The upper aqueous phase was then carefully separated with a pipette, accurately weighed in a pre-weighed aluminum pan, the pan placed in an oven at 130° C. and its contents dried until constant weight, the solid residue washed three times with methylene chloride to remove any trace surfactant, and dried again to a constant weight. The difference between the last weight and the weight of the pan gave the weight of the salt in the aqueous phase. Since the total weight of salt in the system is known from the quantity of brine used, the weight of salt in the surfactant phase could be calculated.

The apparent volume efficiency is defined as the ratio between the weight of water in the surfactant phase and the weight of surfactant used.

Desalination Experiments using Various Surfactant Systems

The general procedure described above was used in each case. Four experiments were run using the following surfactant systems: a) octylphenol+5 EO; b) a 60/40 mixture of octylphenol +10 EO and octylphenol+5 EO; e) same as Co); d) octylphenol+10 EO.

In each of experiments a, b, and d, 6.65 g of brine(3.01%) and 0.35 g surfactant was used.

In experiment c, 14 g of brine and 1 g of surfactant was used.

In experiment a, the starting mixture of brine and surfactant was homogenized at 36° C. before incubation at 51° C. (2 hours). In experiments b and c, the mixtures were homogenized at 10° C. (cloud point from phase diagram 14° C.) before incubation at 30° C. (2 hours) and 21° C. (24 hours) respectively. In experiment d, the mixture was homogenized at 50° C. before incubation at 65° C. (1 hour).

TABLE 10

Desalination Results

| Experiment | Surf. Used | % salt in water in surf. phase | % desalt | Volume Efficiency |
|---|---|---|---|---|
| a | OP-5 | 0.74 | 75.4 | 3.11 |
| b | OP-10/OP-5 | 0.98 | 67.4 | 3.93 |
| c | OP-10/OP-5 | 1.36 | 55 | 8.05 |
| d | OP-10 | 0.156 | 94.8 | 3.10 |

Discussion

Cloud points of various nonionic surfactants and mixtures thereof were determined in distilled water in order to select the candidates for further evaluation. Results are shown in previous section. The surfactants are described in these tables in terms of their chemical composition wherever such compositions were disclosed by their manufacturer. In cases where the compositions were not available the products are described by their tradenames.

Based on the results, two surfactants OP-10 (octylphenol+ 10 EO) and OP-5 (octylphenol+5 EO) were chosen for further studies since they represented a high and a low temperature cloud point surfactant and could also be combined to give an intermediate cloud point.

The cloud points of various combinations of OP-5 and OP-10 in distilled water and in 3.5% sodium chloride solution are shown in the previous section.

As can be seen from these comparative results, a meaningful spread (9°–10° C.) exists between the cloud points in pure water and in 3.5% brine. It is to be further noted that cloud points are generally independent of surfactant concentration at least up to 5% concentration. This, of course, is not necessarily true above 5% concentration, and as we will see, the mutual solubility temperatures of water-surfactant and brine-surfactant systems can vary significantly depending on the compositions of the systems, where the surfactant represents more than 5% of the system.

Mutual solubility temperatures of surfactant-water and surfactant-brine systems for compositions containing more than 5% surfactant were determined. The data generated in these experiments were used to produce phase diagrams 1 through 6.

The desalination experiments carded out in this study have been described in the experimental section.

In short, a mixture of synthetic seawater and surfactant was cooled to a temperature below the solubility curve, so that complete solubility occurred. The system was then warmed to a temperature somewhat above the solubility curve so as to separate the system into two phases. The higher temperature was chosen so that it was close enough to the solubility curve to give good water retention by the surfactant phase, yet high enough to achieve a reasonably rapid separation. As may be seen from the extensive comments made under the phase diagram data, the phases close to the solubility curves are often too viscous for good separation. As the temperature increases for a given composition, the viscosity decreases. The appropriate choice of temperature thus depends upon a compromise between these two factors.

Once the phase separation was complete, the surfactant phase was separated and its water and salt content determined indirectly from those left in the aqueous phase. From here, recovery of the water is a relatively straight forward process of heating to a still higher temperature to squeeze out the excess water, the quantity of water recoverable at any particular temperature being predicted by the solubility curve. The surfactant-held water was found to be significantly lower in salt concentration that the original composition of the brine.

Variations and Ramifications

The process degree of desalination could be increased with a multi-stage process. This process could use the most effective surfactant for the initial stage and a surfactant which yields less degree of desalination(in terms of % of original salt removed) but at a lower temperature for the second stage. In this manner energy can be saved during the second stage.

One of the reasons for achieving a low volume efficiency in the current study is that the phase-separation experiments had to be conducted at a temperature significantly higher than the solubility temperature so that a practical rate of phase separation could be achieved. At or near the solubility temperature, the systems studied exhibited high viscosity and as such also a slow rate of separation, if the viscosity near the solubility temperature could be reduced, a faster rate of separation and improved volume efficiency would be possible.

It is known that nonionic surfactant where the hydrophobic segment is highly branched provide less viscous solutions compared to those where the hydrophobic segments are relatively straight. Though in the surfactant studied here, the hydrophobic segment is branched, it will be worthwhile to study structures where the branchings are significantly higher that the structures used in the current study. One such structure will be the highly branched tridecylalcohol ethoxylates.

Still another approach will be to use a cosolvent with the surfactant so as to reduce the viscosity of the water-in-organic (organic=surfactant+cosolvent) phase. Such a cosolvent should ideally have a very low solubility in brine to minimize loss to the environment, but will dissolve in itself a reasonable mount of water so as not to adversely effect the water -holding capacity of the organic phase. The following table lists a number of organic solvents that meet these criteria. Furthermore, the listed cosolvents have lower solubility in water at higher temperatures, a behavior that makes them akin to nonionic surfactants. Of particular interest for study would be cyclohexanol and 2-ethylbutyl cellosolve. Though their solubility (0.1%) in water at 20° C. is not that low, it is expected that this solubility will be reduced significantly in the presence of a surfactant, since the cosolvent molecules will have a preference to migrate to the surfactant phase rather that remain in the aqueous phase.

TABLE 11

Mutual Solubility of Some Preferred Organic Solvents and Water

| Alcohol | Solubility % w/w (temperature °C.) | |
|---|---|---|
| (Ref 1 page #) | Alcohol in Water | Water in Alcohol |
| Butanol (p. 73) | 7.8 (20) | 20.0 (20) |
| tert-Butyl Alcohol (p. 87) mp. 25.5° C. | Not reported | Not reported |
| Primary Amyl Alcohols: Mixed[2] (p. 38) | 1.7 (20) | 9.2 (20) |
| Pentanol-1 (p. 30) | 2.1 (30) | 7.2 (30) |
| iso-Amyl Alcohol (p. 43) | 2.8 (30) | 7.4 (30) |
| Pentanol-3 (p. 47) | 5.5 (30) | 9.1 (30) |
| tert-Amyl Alcohol (p. 50) | 14.0 (30) | 17.7 (30) |
| Hexanol-1 (p. 324) | 0.6 (20) | 7.2 (20) |
| Cyclohexanol (p. 148) mp. 25.2° C. | 0.1 (20) | 11.8 (20) |
| Heptanol-1 (p. 313) | Not reported | Not Reported |
| Heptanol-2 (p. 315) | 0.35 (20) | 5.1 (20) |
| Octanol-1 (p.417) | 0.03 (20) | Not reported |
| Octanol-2 (p. 120) | 0.05 (20) | 0.1 (20) |
| iso-Octyl Alcohol (p. 291) | 0.1 (20) | 2.6 (20) |
| Decanol-1 (p. 163) | 0.02 (20) | 3.0 (20) |
| Benzyl Cellosolve[3] | 0.04 (20) | 18.0 (20) |
| 2-Ethylbutyl Cellosolve[4] Liquid, mp. 90° C. (p. 256) | 0.1 (20) | 10.0 (20) |

[1]Marsden Solvents Guide, 2nd ed., Interscience Publishers, New York, N.Y., 1963.
[2]Mixture of pentanol-1, 2-methyl-butanol, and 2-methyl-butanol-1. It is a commercial product made by the "oxo" reaction of mixed butenes.
[3]$C_6H_5CH_2OCH_2CH_2OH$ (ethylene glycol monobenzyl ether).
[4]2-(2-ethylbutoxy) ethanol Conclusions and Scope It is therefore clear the nonionic surfactants provide a desalination process without the energy and capital intensive pathways of the current methods.

Thus the scope of the invention is limited neither to the specificities detailed above nor only to the variations stated but also to the appended claims and their legal equivalents.

I claim:

1. A method for recovering relatively salt-free water from an aqueous solution containing salt comprising the steps of:
   a. adding nonionic surfactant having a nonpolar segment and a polar segment to said aqueous salt solution to form a homogeneous mixture of aqueous salt solution and surfactant wherein the mixture exhibits a first cloud point temperature;
   b. adjusting the temperature of the mixture to cause it to phase-separate into a first predominantly aqueous salt-rich phase and a second relatively salt-free phase wherein the second relatively salt-free phase exhibits a second cloud point temperature;
   c. separating the second relatively salt-free phase from the first predominantly aqueous salt-rich phase;
   d. further adjusting the temperature of the second relatively salt-free phase to cause it to phase-separate into a third relatively surfactant-rich phase and a fourth relatively surfactant-free water phase consisting substantially of relatively salt-free water; and e. separating the fourth relatively surfactant-free phase from the third relatively surfactant-rich phase to recover relatively salt-free water.

2. A method for recovering relatively salt-free water from an aqueous solution containing salt according to claim 1 wherein the aqueous solution comprises a mixture of salts.

3. A method for recovering relatively salt-free water from an aqueous solution containing salt according to claim 1 wherein the salt comprises sodium chloride.

4. A method for recovering relatively salt-free water from an aqueous solution containing salt according to claim 1 wherein the salt in the aqueous solution is present at a concentration of about 0.35 to about 0.4% by weight.

5. A method for recovering relatively salt-free water from an aqueous solution containing salt according to claim 1 wherein the salt in the aqueous solution is present at a concentration of about 0.1 to about 0.35% by weight.

6. A method for recovering relatively salt-free water from an aqueous solution containing salt according to claim 1 wherein the surfactant is a mixture of nonionic surfactants.

7. A method for recovering relatively salt-free water from an aqueous solution containing salt according to claim 1 wherein the nonionic surfactant comprises at least one surfactant selected from the group consisting of a. alkyloxyalkoxylate having the structure

RO$+$CH$_2$CH$_2$O$\overline{\phantom{n}}_n$H wherein R is a linear or branched $C_6$ to $C_{22}$ alkyl group and n is an integer from 5 to 30, b. aryloxyalkoxylate having the structure

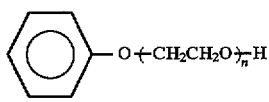

O$+$CH$_2$CH$_2$O$\overline{\phantom{n}}_n$H wherein n is an integer from 5 to 30, c. alkylphenoxyalkoxylate having the structure

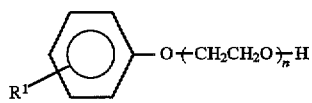

O$+$CH$_2$CH$_2$O$\overline{\phantom{n}}_n$H

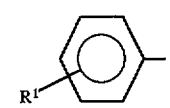

wherein $R^1$ is a linear or branched $C_6$ to $C_{22}$ alkyl group and n is an integer from 5 to 30, d. copolymers of ethyleneoxide and propyleneoxide and mixtures thereof.

8. A method for recovering relatively salt-free water from an aqueous solution containing salt according to claim 7 wherein the at least one surfactant is alkylphenoxyalkoxylate, $R^1$ is octyl and n is 10.

9. A method for recovering relatively salt-free water from an aqueous solution coming salt according to claim 7 wherein the surfactant comprises a mixture of surfactants with a multiplicity of polyethyleneoxy chain lengths.

10. A method for recovering relatively salt-free water from an aqueous solution containing salt according to claim 7 wherein the surfactant comprises a mixture of surfactants with a multiplicity of nonpolar segments.

11. A method for recovering relatively salt-free water from an aqueous solution containing salt according to claim 1 wherein the first cloud point temperature is lower than the second cloud point temperature.

12. A method for recovering relatively salt-free water from an aqueous solution containing salt according to claim 1 wherein the temperature of the mixture in step (b) is adjusted to a temperature between the first cloud point temperature and the second cloud point temperature.

13. A method for recovering relatively salt-free water from an aqueous solution containing salt according to claim 1 wherein the temperature of the mixture in step (b) is adjusted to a temperature between the first cloud point temperature and 5° C. above the first cloud point temperature.

14. A method for recovering relatively salt-free water from an aqueous solution containing salt according to claim 1 which comprises subjecting the relatively salt-free water to further purification.

15. A method for recovering relatively salt-free water from an aqueous solution containing salt according to claim 14 wherein the further purification comprises treating the relatively salt-free water with activated carbon.

16. A method for recovering relatively salt-free water from an aqueous solution containing salt according to claim 15 wherein the activated carbon is in the form of a fixed bed and the further purification is effected by passing the relatively salt-free water through the bed.

17. A method for recovering relatively salt-free water from an aqueous solution containing salt according to claim 14 wherein the further purification comprises addition of surfactant, temperature adjustment and phase seperation.

18. A method for recovering relatively salt-free water from an aqueous solution containing salt according to claim 17 wherein the surfactant used in the additional purification steps is different from the surfactant used in the initial purification.

19. A method for recovering relatively salt-free water from an aqueous solution containing salt according to claim 1 wherein a cosolvent is added with the surfactant.

20. A method for recovering relatively salt-free water from an aqueous solution containing salt according to claim 19 wherein the cosolvent is selected from the group consisting of cyclohexanol and 2-ethylbutyl cellosolve.

21. A method for recovering relatively salt-free water from an aqueous solution containing salt according to claim 1 wherein the surfactant is added to the aqueous salt solution at substantially ambient temperature.

22. A method for recovering relatively salt-free water from seawater or brackish water comprising the steps of:

a. adding nonionic surfactant having a nonpolar segment and a polar segment to said seawater or brackish water to form a homogeneous mixture of seawater or brackish water and surfactant wherein the mixture exhibits a first cloud point temperature;

b. heating the mixture to cause it to phase-separate into a first predominantly aqueous salt-rich phase and a second relatively salt-free phase wherein the second relatively salt-free phase exhibits a second cloud point temperature;

c. separating the second relatively salt-free phase from the first predominantly aqueous salt-rich phase;

d. further heating the second relatively salt-free phase to cause it to phase-separate into a third relatively surfactant-rich phase and a fourth relatively surfactant-free water phase consisting substantially of relatively salt-free water; and e. separating the fourth relatively surfactant-free phase from the third relatively surfactant-rich phase to recover relatively salt-free water.

23. A method for recovering relatively salt-free water from seawater or brackish water according to claim 22 wherein the surfactant comprises at least one surfactant selected from the group consisting of a. alkyloxyalkoxylate having the structure

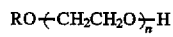

wherein R is a linear or branched $C_6$ to $C_{22}$ alkyl group and n is an integer from 5 to 30, b. axyloxyalkoxylate having the structure

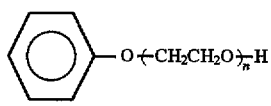

wherein n is an integer from 5 to 30, c. alkylphenoxyalkoxylate having the structure

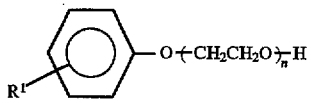

wherein $R^1$ is a linear or branched $C_6$ to $C_{22}$ alkyl group and n is an integer from 5 to 30, d. copolymers of ethyleneoxide and propyleneoxide and mixtures thereof.

24. A method for recovering relatively salt-free water from seawater or brackish water according to claim 23 wherein the at least one surfactant is alkylphenoxyalkoxylate, $R^1$ is octyl and n is 10.

25. A method for recovering relatively salt-free water from seawater or brackish water according to claim 22 wherein the surfactant is added to the aqueous salt solution at substantially ambient temperature.

* * * * *